(12) United States Patent
Maley

(10) Patent No.: US 12,227,145 B2
(45) Date of Patent: Feb. 18, 2025

(54) MACHINE SECURITY SYSTEM

(71) Applicant: Caterpillar Inc., Peoria, IL (US)

(72) Inventor: Jacob C. Maley, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 7 days.

(21) Appl. No.: 18/099,545

(22) Filed: Jan. 20, 2023

(65) Prior Publication Data

US 2024/0246510 A1   Jul. 25, 2024

(51) Int. Cl.
| | |
|---|---|
| *B60R 25/104* | (2013.01) |
| *B60R 25/10* | (2013.01) |
| *B60R 25/102* | (2013.01) |
| *B60R 25/20* | (2013.01) |
| *B60R 25/30* | (2013.01) |
| *B60R 25/40* | (2013.01) |
| *E02F 9/20* | (2006.01) |
| *E02F 9/24* | (2006.01) |
| *E02F 9/26* | (2006.01) |
| *G08B 21/22* | (2006.01) |

(52) U.S. Cl.
CPC .......... *B60R 25/104* (2013.01); *B60R 25/102* (2013.01); *B60R 25/20* (2013.01); *B60R 25/305* (2013.01); *B60R 25/403* (2013.01); *E02F 9/2066* (2013.01); *E02F 9/2091* (2013.01); *E02F 9/2095* (2013.01); *E02F 9/24* (2013.01); *E02F 9/26* (2013.01); *E02F 9/261* (2013.01); *G08B 21/22* (2013.01); *B60R 2025/1013* (2013.01); *B60R 2025/1016* (2013.01); *B60R 2325/205* (2013.01); *B60R 2325/308* (2013.01)

(58) Field of Classification Search
CPC ..... B60R 25/104; B60R 25/102; B60R 25/20; B60R 25/403; B60R 2025/1013; B60R 2025/1016; B60R 2325/205; B60R 25/305; B60R 25/31; B60R 25/10; B60R 2325/308; B60R 25/245; E02F 9/2091; E02F 9/26; E02F 9/2066; E02F 3/435; E02F 9/205; E02F 9/2095; E02F 9/261; E02F 9/24; G08B 21/22; G08B 7/06
See application file for complete search history.

(56) References Cited

U.S. PATENT DOCUMENTS 4,600,356 A * 7/1986 Bridges .................. E02F 9/245
                                                    172/6
5,198,800 A * 3/1993 Tozawa ................. E02F 9/2033
                                                    340/685
(Continued)

FOREIGN PATENT DOCUMENTS

| CN | 115071495 A | 9/2022 |
| JP | 2005267568 A | 9/2005 |

(Continued)

OTHER PUBLICATIONS

Written Opinion and International Search Report for Int'l. Patent Appln. No.PCT/US2024/010389, mailed May 8, 2024 (25 pgs).

*Primary Examiner* — Timothy Wilhelm

(57) ABSTRACT

A work machine comprising a security system for deterring theft is disclosed. The work machine comprises a frame, a battery, a ground engaging element supporting the frame; and a security system configured to activate an at least one anti-theft deterrent when an unauthorized person is detected in a detection zone around the work machine.

16 Claims, 8 Drawing Sheets

(56) References Cited

U.S. PATENT DOCUMENTS

| | | | | |
|---|---|---|---|---|
| 5,490,081 | A * | 2/1996 | Kuromoto | E02F 9/24 340/685 |
| 5,711,391 | A * | 1/1998 | Brandt | E02F 9/2275 180/273 |
| 6,072,396 | A * | 6/2000 | Gaukel | G16H 40/67 340/8.1 |
| 6,186,260 | B1 * | 2/2001 | Schenck | B60K 25/00 180/273 |
| 6,226,902 | B1 * | 5/2001 | Heyne | E02F 9/2004 37/348 |
| 6,577,909 | B1 * | 6/2003 | McGowan | G05B 9/02 700/79 |
| 6,629,050 | B2 * | 9/2003 | Modgil | B60R 25/04 307/10.6 |
| 7,103,545 | B2 * | 9/2006 | Furuta | E02F 9/26 704/275 |
| 7,283,903 | B2 * | 10/2007 | Merten | E02F 9/166 307/10.6 |
| 7,295,098 | B2 | 11/2007 | Betts, Jr. | |
| 7,342,486 | B2 * | 3/2008 | Tsukada | E02F 9/26 348/148 |
| 7,743,865 | B2 * | 6/2010 | Brunner | G01S 17/10 180/271 |
| 7,899,597 | B2 * | 3/2011 | Vitale | E02F 9/2095 701/50 |
| 8,016,074 | B2 * | 9/2011 | Black | B66F 11/044 182/2.1 |
| 8,248,263 | B2 * | 8/2012 | Shervey | G07C 9/28 340/8.1 |
| 8,346,512 | B2 * | 1/2013 | McAree | E02F 9/2033 701/1 |
| 8,437,920 | B2 * | 5/2013 | Hobenshield | E02F 9/26 701/50 |
| 8,700,246 | B2 * | 4/2014 | Kurikuma | E02F 9/2246 701/50 |
| 8,768,583 | B2 * | 7/2014 | Hargrave, Jr. | E02F 9/262 340/436 |
| 8,773,286 | B1 * | 7/2014 | Friend | A23L 33/105 340/435 |
| 8,810,210 | B2 * | 8/2014 | Yokoyama | B60L 50/40 320/166 |
| 8,880,302 | B1 * | 11/2014 | Tachibana | E02F 9/2296 60/459 |
| 8,917,292 | B2 * | 12/2014 | Gotou | E02F 9/267 348/148 |
| 9,030,332 | B2 * | 5/2015 | Tafazoli Bilandi | E02F 9/262 348/222.1 |
| 9,080,311 | B2 * | 7/2015 | Yoshida | E02F 9/2285 |
| 9,133,602 | B2 * | 9/2015 | Ooki | E02F 9/2095 |
| 9,133,604 | B2 * | 9/2015 | Kodaka | B60T 13/66 |
| 9,206,588 | B2 * | 12/2015 | Wu | B60L 50/15 |
| 9,249,556 | B2 * | 2/2016 | Magaki | E02F 9/2282 |
| 9,457,715 | B2 * | 10/2016 | Mitsuta | B60P 1/283 |
| 9,457,718 | B2 * | 10/2016 | Husted | B60R 1/27 |
| 9,587,380 | B2 * | 3/2017 | Matsumoto | E02F 9/261 |
| 9,598,036 | B2 * | 3/2017 | Lim | B66C 15/06 |
| 9,657,458 | B2 * | 5/2017 | Hutchinson | E02F 9/0833 |
| 9,695,024 | B2 * | 7/2017 | Herauf | E01D 19/106 |
| 9,695,982 | B2 * | 7/2017 | Rivet | F16P 3/147 |
| 9,715,015 | B2 * | 7/2017 | Izumikawa | G06V 20/56 |
| 9,776,566 | B2 * | 10/2017 | Ishimoto | B60R 1/00 |
| 9,836,938 | B2 * | 12/2017 | Kiyota | E02F 9/24 |
| 9,911,320 | B2 * | 3/2018 | Franz | G08C 23/04 |
| 9,975,472 | B2 * | 5/2018 | Wadell | B60Q 1/0094 |
| 9,975,522 | B2 * | 5/2018 | Nakamura | E02F 9/2062 |
| 9,990,543 | B2 * | 6/2018 | Fukuda | B60R 11/04 |
| 9,995,232 | B2 * | 6/2018 | Khafagy | F02D 41/042 |
| 10,100,497 | B2 * | 10/2018 | Izumikawa | E02F 3/435 |
| 10,323,386 | B2 * | 6/2019 | Kiyota | E02F 9/26 |
| 10,380,473 | B2 * | 8/2019 | Manci | G05D 1/0282 |
| 10,507,793 | B1 * | 12/2019 | De Moura Partika | G08B 13/19613 |
| 10,527,731 | B2 * | 1/2020 | Kinoshita | G01S 17/931 |
| 10,544,567 | B2 * | 1/2020 | Petrany | E02F 9/261 |
| 10,697,152 | B2 * | 6/2020 | Izumikawa | E02F 9/264 |
| 10,794,046 | B2 * | 10/2020 | Imura | E02F 9/26 |
| 10,915,308 | B2 * | 2/2021 | Mori | B60R 16/02 |
| 10,927,528 | B2 * | 2/2021 | Morimoto | E02F 9/2004 |
| 10,967,834 | B2 | 4/2021 | Kinugawa | |
| 11,015,319 | B2 * | 5/2021 | Izumikawa | E02F 9/2041 |
| 11,149,406 | B2 * | 10/2021 | Doi | B60W 30/00 |
| 11,292,700 | B2 * | 4/2022 | Lyngbäck | B66C 13/46 |
| 11,320,830 | B2 * | 5/2022 | Moorehead | E02F 9/265 |
| 11,365,527 | B2 * | 6/2022 | Kiyota | G06V 20/58 |
| 11,479,945 | B2 * | 10/2022 | Yamamoto | E02F 9/262 |
| 11,501,619 | B2 * | 11/2022 | Cherney | G08B 21/02 |
| 11,532,221 | B1 * | 12/2022 | Rogan | G08B 25/00 |
| 11,624,214 | B2 * | 4/2023 | Elangovan | B60R 25/245 340/5.72 |
| 11,697,920 | B2 * | 7/2023 | Kiyota | E02F 9/26 382/103 |
| 11,781,290 | B2 * | 10/2023 | Kurokawa | H04N 7/18 701/50 |
| 2010/0036645 | A1 * | 2/2010 | McAree | B60T 7/22 703/1 |
| 2012/0327261 | A1 * | 12/2012 | Tafazoli Bilandi | E02F 9/24 348/E5.022 |
| 2013/0088593 | A1 * | 4/2013 | Ishimoto | E02F 9/226 348/143 |
| 2014/0354813 | A1 * | 12/2014 | Ishimoto | E02F 9/24 348/148 |
| 2015/0077281 | A1 | 3/2015 | Taniguchi et al. | |
| 2015/0175071 | A1 * | 6/2015 | Ishimoto | E02F 9/262 348/148 |
| 2015/0240454 | A1 * | 8/2015 | Yogita | E02F 9/2066 60/277 |
| 2016/0200252 | A1 * | 7/2016 | Oota | E02F 9/24 348/148 |
| 2016/0202351 | A1 * | 7/2016 | Uotsu | G01S 13/867 342/27 |
| 2016/0311401 | A1 * | 10/2016 | Altawil | B60R 25/1004 |
| 2017/0028919 | A1 * | 2/2017 | Izumikawa | E02F 9/267 |
| 2017/0073935 | A1 * | 3/2017 | Friend | E02F 9/265 |
| 2017/0107692 | A1 * | 4/2017 | Robertson | E02F 3/48 |
| 2017/0298595 | A1 * | 10/2017 | Machida | H04N 23/90 |
| 2017/0305018 | A1 * | 10/2017 | Machida | B25J 9/1674 |
| 2018/0072269 | A1 * | 3/2018 | Tong | B60R 25/305 |
| 2018/0122218 | A1 * | 5/2018 | Shanley | E02F 9/262 |
| 2018/0258616 | A1 * | 9/2018 | Kiyota | G06T 1/00 |
| 2018/0274206 | A1 * | 9/2018 | Kozui | E02F 9/123 |
| 2019/0061687 | A1 * | 2/2019 | Khalil | B60R 25/2072 |
| 2019/0170879 | A1 * | 6/2019 | Kinoshita | G01B 21/18 |
| 2019/0237987 | A1 * | 8/2019 | Martell | H02J 7/0048 |
| 2020/0399863 | A1 * | 12/2020 | Aizawa | B60R 11/02 |
| 2022/0153232 | A1 * | 5/2022 | Gallagher | A61G 3/062 |
| 2022/0154431 | A1 * | 5/2022 | Kurosawa | E02F 3/435 |
| 2022/0219954 | A1 * | 7/2022 | Teranishi | B66C 13/46 |
| 2022/0314931 | A1 * | 10/2022 | Yates | B60R 25/104 |
| 2022/0397897 | A1 * | 12/2022 | Pandita | E02F 9/262 |
| 2023/0083504 | A1 * | 3/2023 | Burns | B60R 25/305 705/4 |
| 2023/0111327 | A1 * | 4/2023 | Ling | H04W 4/024 345/633 |
| 2023/0278526 | A1 * | 9/2023 | Broadnax | B60R 25/1001 340/426.1 |
| 2023/0339429 | A1 * | 10/2023 | Maley | H02J 7/0068 |

FOREIGN PATENT DOCUMENTS

| | | |
|---|---|---|
| JP | 2011046319 A | 3/2011 |
| JP | 4794617 B2 | 10/2011 |
| JP | 5117448 B2 | 1/2013 |
| KR | 100786698 B1 | 12/2007 |
| KR | 101219131 B1 | 1/2013 |

* cited by examiner

MACHINE SECURITY SYSTEM

TECHNICAL FIELD

The present disclosure generally relates to work machines, and more particularly relates to security systems for work machines.

BACKGROUND

Work machines in the construction, mining, and agricultural industries comprise components that are expensive and not easily replaced. Such machines include but are not limited to excavators, track-type tractors and the like. Thus, it is vital to provide work machines with security systems to prevent theft and damage from intruders or unauthorized users, especially during off-work hours and at night. An owner/operator may wish to protect a work machine and its components from theft when not in use or operation. The owner/operator of the work machine may also wish to restrict access to certain systems on the work machine.

To address the above concerns, various theft-protection systems have emerged, which attempt to provide theft protection capabilities. In many of these systems, a controller, to which an operator has access, communicates with the work machine, the components, or the systems of the work machine (i.e. ignition system). When the controller detects an unauthorized operator, it may deactivate a system such as the engine or ignition system.

Conventional systems only provide for restricting access to a system of the work machine as an anti-theft security system but fail to activate a deterrent to prevent theft or deter unauthorized access to the work machine. For example, U.S. Pat. No. 7,295,098 discloses a system and method for providing theft protection in a work machine. The security system activates a module to restrict access to operational systems in the work machine such as the ignition system, braking systems, navigation system, and/or other propulsion system. As can be seen, the prior art only provides an anti-theft system that restricts access to parts of the work machine and fails to provide a security system that activates a deterrent mechanism to prevent theft and damage to the work machine and its components.

It can therefore be seen that a need exists for a security system in a work machine that activates deterrents to prevent theft and deter access to the work machine and its components by unauthorized persons.

SUMMARY OF THE DISCLOSURE

In accordance with one aspect of the disclosure, a work machine comprising a frame, a battery, a ground engaging element supporting the frame; and a security system configured to activate an at least one anti-theft deterrent when an unauthorized person is detected in a detection zone around the work machine is disclosed.

In accordance with another aspect of the disclosure, a security system for a work machine is disclosed. The security system comprises: a battery; a plurality of cameras; a plurality of sensors; a controller, the controller connected to an at least one anti-theft deterrent in the work machine; and the controller is configured to activate the at least one anti-theft deterrent when the plurality of cameras or the plurality of sensors detect an unauthorized person within a detection zone.

In accordance with another aspect of the disclosure, a method for deterring theft in a work machine is disclosed. The method comprises: providing a frame, a ground engaging element supporting the frame, an engine, a battery operatively mounted to the engine, a controller, a plurality of imaging devices, a plurality of sensors, and a security system for deterring theft in the work machine; activating the security system in the work machine; monitoring, by the security system via the plurality of imaging devices and plurality of sensors, for persons approaching the work machine; detecting an unauthorized person; activating at least one anti-theft deterrent.

These and other aspects and features of the present disclosure will be better understood upon reading the following detailed description when read in conjunction with the accompanying drawings.

Figure 1:
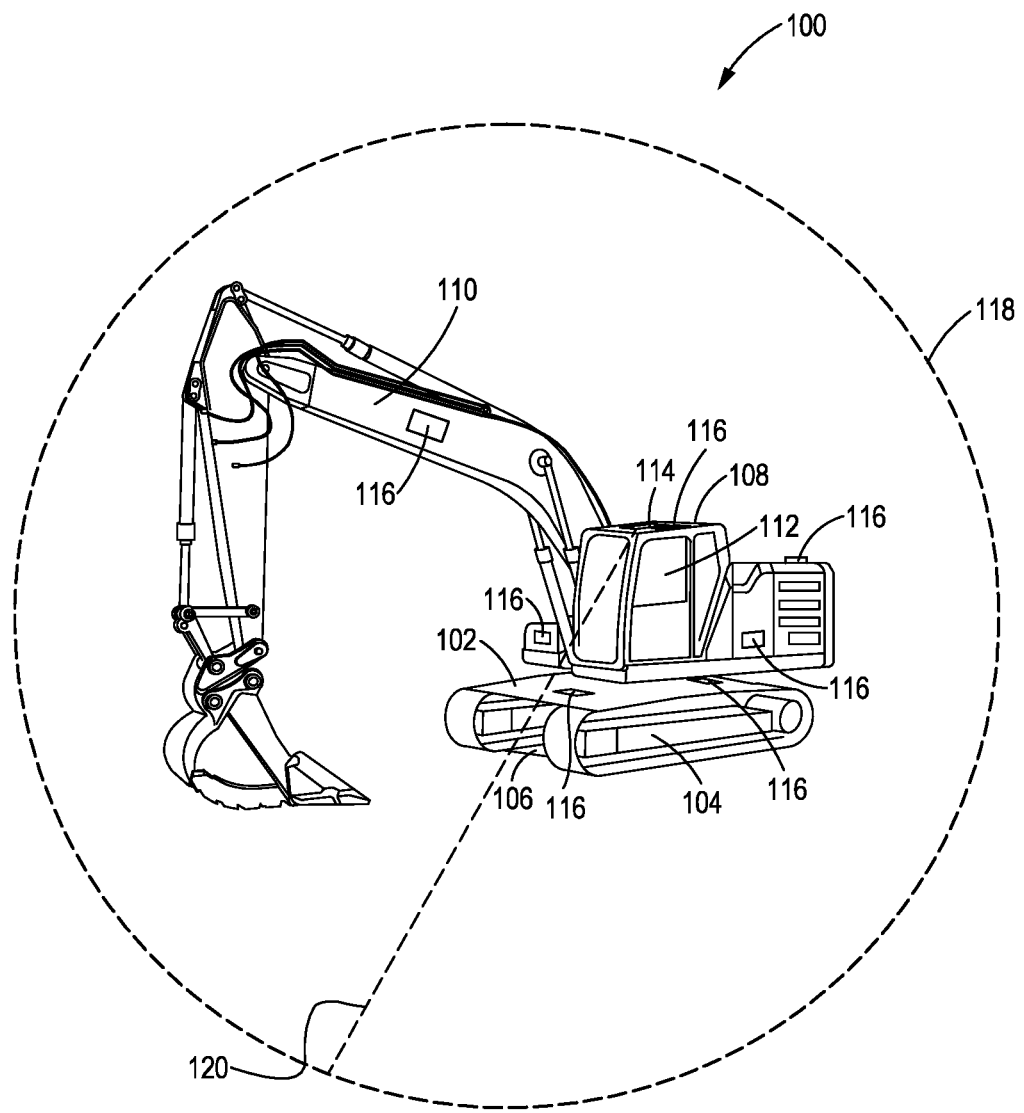
FIG. 1 is a perspective view of a work machine having a security system, according to one embodiment of the disclosure.

The figures depict one embodiment of the presented invention for purposes of illustration only. One skilled in the art will readily recognize from the following discussion that alternative embodiments of the structures and methods illustrated herein may be employed without departing from the principles described herein.

DETAILED DESCRIPTION

Referring now to the drawings, and with specific reference to the depicted example, a work machine 100 is shown, illustrated as an exemplary excavator. Excavators are heavy equipment designed to move earth material from the ground or landscape at a dig site in the construction and agricultural industries. While the following detailed description describes an exemplary aspect in connection with the excavator, it should be appreciated that the description applies equally to the use of the present disclosure in other work machines including but not limited to backhoes, front-end loaders, skid steers, wheel loaders, and tractors, as well.

Referring now to FIG. 1, the work machine 100 comprises a frame 102. The frame 102 is supported on ground engaging elements 104, illustrated as continuous tracks. It should be contemplated that the ground engaging elements 104 may be any other type of ground engaging elements 104 such as, for example, wheels, etc. The work machine 100 further includes an engine 106 in the frame 102, a cab 108 for operator personnel, and a working mechanism 110 extending from the frame 102 for conducting work, such as, for example, excavating landscapes or otherwise moving earth, soil, or other material at a dig site. The frame 102 may be an upper swiveling body common with excavators and work machines in the agricultural and construction industries. The work machine 100 may have autonomous capability and may not require an operator present in the cab 108. The work machine 100 may have remote control capabilities removing the necessity for an operator's presence in the cab 108. A display interface 112 may be provided in the cab 108 for operator use.

As illustrated in one embodiment, the work machine 100 further includes a plurality of imaging devices 114 and a plurality of sensors 116 for monitoring a detection zone 118 around the work machine 100. The detection zone 118 may be 360-degree coverage and have a radial detection distance 120 around the work machine 100. As an example, the radial detection distance 120 may be up to 16 meters around the work machine 100, in one exemplary embodiment. The detection zone 118 may also be a smaller coverage around the work machine 100 such as 180-degree or 270-degree coverage.

Figure 2:
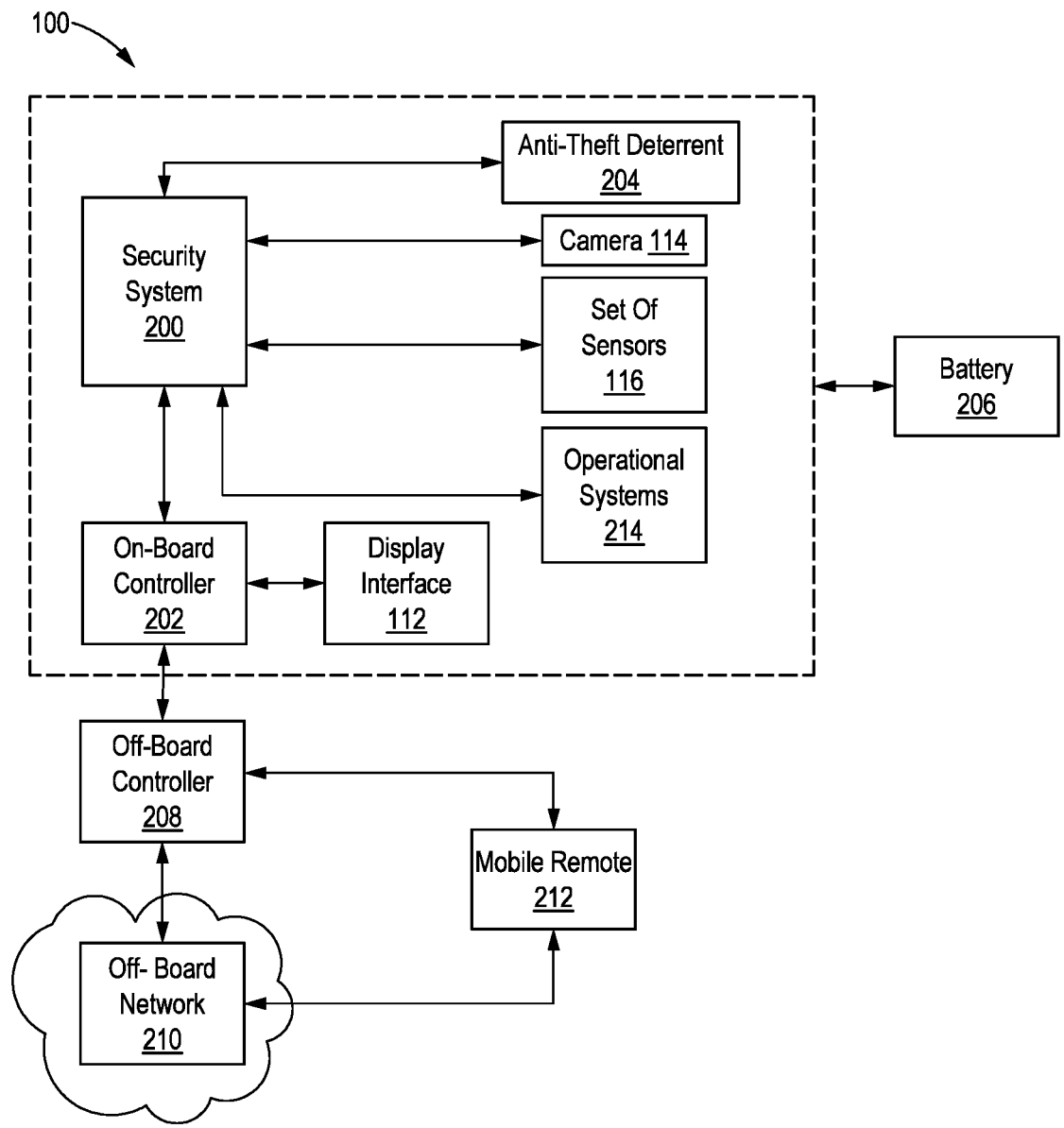
FIG. 2 is a schematic of a security system in a work machine, according to one embodiment of the disclosure.

Now referring to FIG. 2, a schematic of a security system 200 in the work machine 100 is illustrated. The work machine 100 may further comprise an on-board controller 202, anti-theft deterrents 204, and a battery 206 connected to the security system 200 and the work machine 100. The security system 200 may be connected to the on-board controller 202 and the anti-theft deterrents 204. The on-board controller 202 may be connected to the display interface 112 in the cab 108 of the work machine 100.

An operator may use the display interface 112 to activate or deactivate the security system 200. When activated, the security system 200 will send a signal to the on-board controller 202 to activate the anti-theft deterrents 204 when a person is detected by the plurality of imaging devices 114 and/or the plurality of sensors 116.

The on-board controller 202 may be connected to an off-board controller 208. The on-board controller 202 and the off-board controller 208 may communicate with each other through an off-board network 210. Furthermore, a mobile remote 212 may be connected to the off-board network 210 for controlling the security system 200 remotely. The mobile remote 212 may be a computer, laptop, mobile phone, tablet, or the like, that may access the off-board network 210 through a website, url, app, or the like, as generally known in the arts.

The on-board controller 202 in the work machine 100 may control operational systems 214 associated with the work machine 100. The operational systems 214 may be one of many operating systems found within a work machine 100 such as an ignition system, a fuel injection system, an oil transport system, a transmission, a throttle system, a power system, a braking system, a cooling system, a navigation system, a lighting system, an alarm system, a battery system, and/or an engine or other propulsion system, as generally known in the arts. These systems may also include one or more hydraulic, mechanical, electronic, and software-based components in which the on-board controller 202 may communicate with and control, as generally known in the arts. The mobile remote 212 may be used to communicate with the on-board controller 202, via the off-board network 210 and/or the off-board controller 208, to control, activate, or deactivate the operational systems 214 and the anti-theft deterrents 204 within the work machine 100.

The security system 200 is normally activated when the work machine 100 is no longer in use by the owner or operator so that the security system 200 deters theft while the owner/operator is away. When the work machine 100 is turned off and the security system 200 is activated, the security system 200 is powered by a battery 206 provided in or connected to the work machine 100. The security system 200 will operate and monitor the work machine 100, as long as power from the battery 206 is provided. The battery 206 may provide power for at least 10 hours in a single use or single charge.

The security system 200 is further connected to the plurality of imaging devices 114 and the plurality of sensors 116. The security system 200 uses the plurality of imaging devices 114 and the plurality of sensors 116 to monitor the work machine 100 and activate the anti-theft deterrents 204 when a person is detected within the detection zone 118. In one embodiment, there may be four imaging devices 114 provided on the work machine 100 and connected to the security system 200. The plurality of imaging devices 114 may include stereo cameras, smart cameras, monocular cameras, wired ethernet cameras with high compute FPGA, or smart vision systems having a dedicated processor onboard, including video processing acceleration provided by Field Programmable Gate array (FPGA), digital signal processor (DSP), general purpose graphics processing unit (GP-GPU), or any other suitable microprocessor with supporting application software, capable of detecting persons within the detection zone 118 from images or real-time videos. The processing of images and real-time videos may occur within a processor provided in the plurality of imaging devices 114, a nearby control module provided in the work machine 100, or via an off-board the work machine 100 via cloud computing, back office computing, and the like, as generally known in the arts.

The plurality of sensors 116 may includes proximity sensors that generally detect a person or object upon entering the detection zone 118. The plurality of sensors 116 may also include ultrasonic sensors which may use high frequency sound waves or RADAR sensors that use RF to determine if an object has been detected in its field of view. A variety of possible proximity sensors, LIDAR sensors, inertial measurement unit (IMU) sensors, ultrasonic sensors, and the like may be used. IMU sensors may also be utilized for detecting movement of the work machine 100. There are a number of different ways for the plurality of sensors 116, generally, and the individual sensors, specifically, to be constructed and/or mounted to the work machine 100, the frame 102, the cab 108, and the working mechanism 110, or other portions of the work machine 100. This may depend, in part, on the design and assembly of the work machine 100. Generally, the plurality of sensors 116 range in complexity from simplistic proximity devices to more complicated devices which include their own onboard computer processors, wired or wireless technology, memory, and the communication adapters. The work machine 100 may use the plurality of sensors 116 for detecting an unauthorized person within the detection zone 118 and alert the security system 200 to activate the anti-theft deterrents 204, via the off-board controller 202.

The plurality of imaging devices 114 and the plurality of sensors 116 may function to record, store, and report information to the on-board controller 202, the off-board controller 208, and/or the off-board network 210. Any given sensor 116 or imaging device 114 may record or append a time stamp of recorded data for when the data was recorded. Data collected by the plurality of imaging devices 114 and the plurality of sensors 116 is communicated to the on-board controller 202, the off-board controller 208, and off-board network 210 to assist in providing data to the mobile remote 212 for remote accessibility of the data from the security system 200.

The anti-theft deterrents 204 may consist of a variety of deterrents that may be activated by the security system 200. The anti-theft deterrents 204 may be a lighting deterrent, an audible deterrent, an engine deterrent, an imaging deterrent, or an alert deterrent. The anti-theft deterrents 204 may be provided in the work machine 100 or exist in one of the operational systems 214 provided within the work machine 100.

Figure 3:
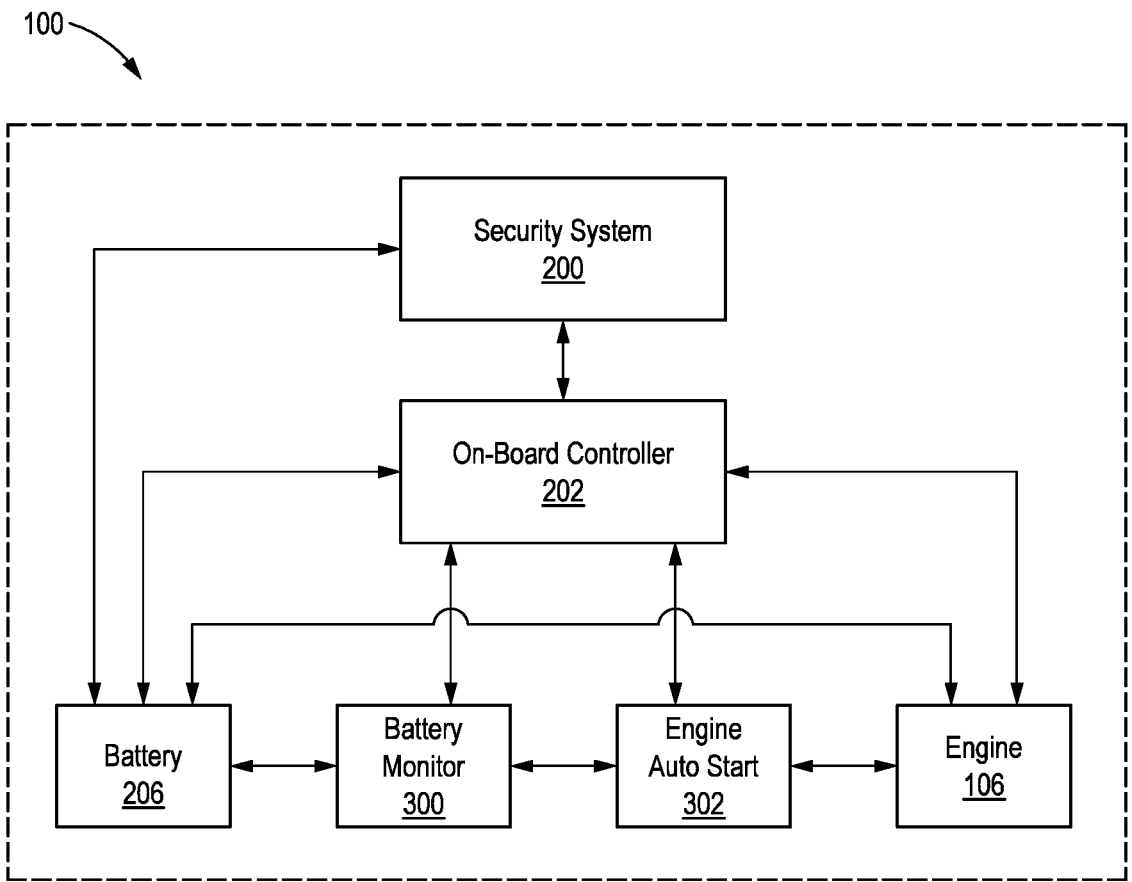
FIG. 3 is schematic of the power system of the security system in the work machine, according to one embodiment of the disclosure.

Referring the FIG. 3, a schematic of the power system for the security system 200 in the work machine 100 is illustrated, in one embodiment of the disclosure. The on-board controller 202 and the battery 206 are further connected to a battery monitor 300 and an engine auto-start 302. To avoid running out of power in the battery 206 so that the security system 200 remains active and operational for extended periods, the battery monitor 300 and the engine auto-start 302 are provided in the work machine 100. The battery monitor 300 monitors the remaining power of the battery 206 while the battery 206 is being used to power the security system 200 as it monitors the work machine 100. The battery monitor 300 monitors the battery 206 for various configurable thresholds. The work machine 100 may also be an engineless machine having a large battery 206 with the battery monitor 300 to monitor for a low battery voltage threshold, whereby the engine auto-start 302 is not required.

The engine auto-start 302, may be connected to the on-board controller 202, the battery 206, the engine 106, and the battery monitor 300. When the remaining life of the battery 206 falls below a warning threshold, the on-board controller 202 will alert the engine auto-start 302 and activate the engine 106 to provide power in the work machine 100 and recharge the battery 206, as generally known in the arts. The engine 106 may be requested to start when the battery 206 voltage reaches a configurable warning threshold. The engine auto-start 302 may have a variety of triggers for activation such as a sub-system for tending the battery 206, monitoring temperature and pressure, pre-determined conditions such as the temperature of oil and fluids, remote auto-start activation, or the like, as generally known in the arts.

The engine auto-start 302 allows the security system 200 to continue monitoring the work machine 100 for extended periods of time beyond a single charge of the battery 206 because the engine auto-start 302 activates the engine 106 to recharge the battery 206. For example, the battery 206 may have a life of 12 hours and the battery monitor 300 may alert the on-board controller 202 when the life of the battery 206 reduces to below 1-hour remaining, to activate the engine auto-start 302 to continue powering the security system 200 and recharge the battery 206 for extended anti-theft deterrence. The frequency of replacing the battery 206 is reduced by using the battery monitor 300 and an engine auto-start 302 with the security system 200 in the work machine 100.

Figure 4:
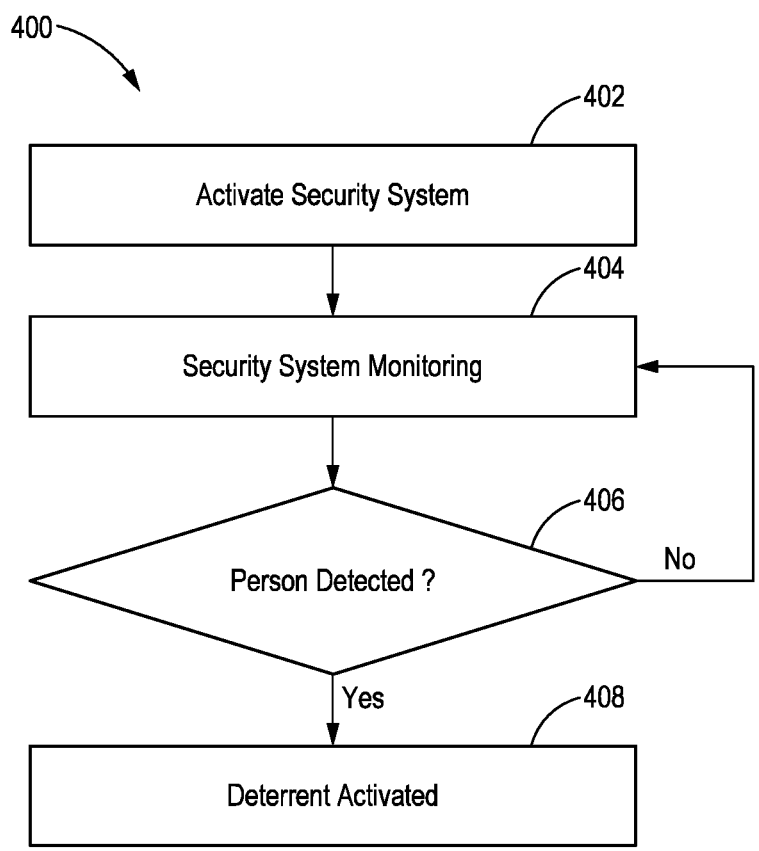
FIG. 4 is a flow chart depicting the activation of the security system in a work machine, according to one embodiment of the disclosure.

Referring to FIG. 4, a flow chart of activating the security system 200 to deter theft in the work machine 100 is shown, according to one embodiment of the disclosure. The activation process 400 of the security system 200 in the work machine 100 begins with activating the security system 200, in a step 402. The security system 200 may be activated by selecting an activation switch on the display interface 112 in the cab 108 or by using the mobile remote 212 while away from the work machine 100. In a step 404, the security system 200 begins monitoring the work machine 100 until a person is detected in the detection zone 118, in step 406. In a step 408, at least one of the anti-theft deterrents 204 are activated to deter a potential thief.

Figure 5:
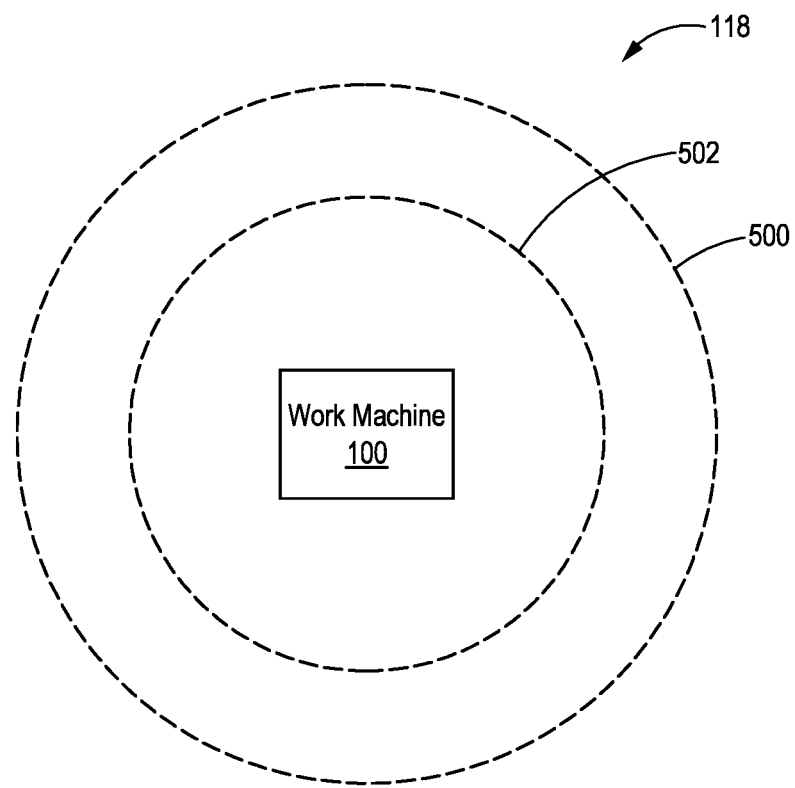
FIG. 5 is a schematic of the detection zone of the work machine, according to one embodiment of the disclosure.
Figure 6:
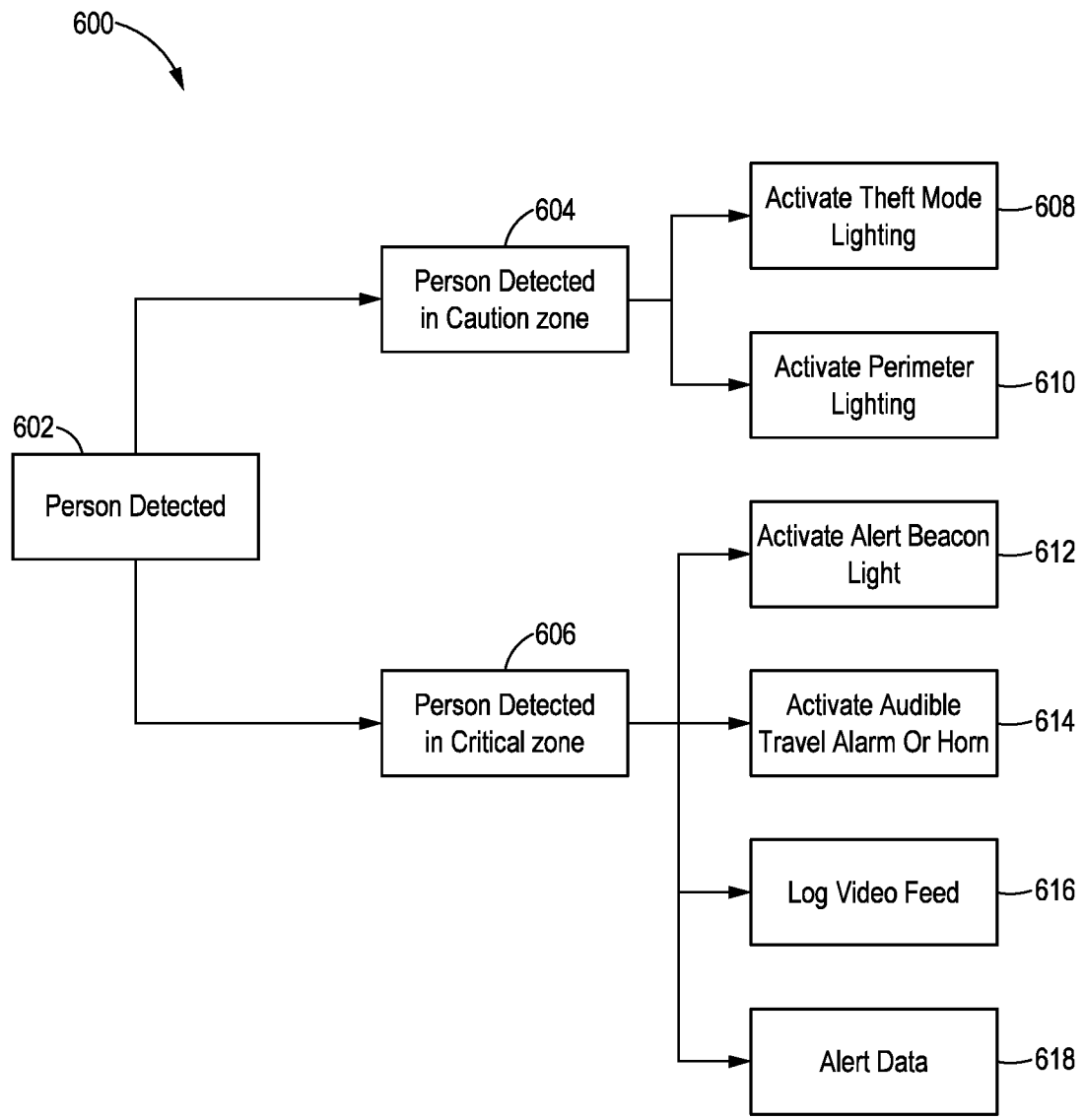
FIG. 6 is a flow chart of the detection monitoring and deterrent activation of the security system, according to one embodiment of the disclosure.

Referring now to FIGS. 5-6, detection monitoring and deterrent activating by the security system 200 is illustrated in one embodiment of the disclosure. FIG. 5 illustrates the detection zone 118 around the work machine 100. The detection zone 118 may include a caution zone 500 and a critical zone 502. The plurality of imaging devices 114 and the plurality of sensors 116 may be configured to detect a plurality of sub-detection zones within the detection zone 118, such as the caution zone 500 and the critical zone 502.

FIG. 6 illustrates a deterrent activation process 600 for detecting a person in the detection zone 118 and activating the anti-theft deterrents 204 based on detection of a person in the caution zone 500 and the critical zone 502. When a person is detected in the detection zone 118, in activation step 602, the detection may first occur in the caution zone 500 and then the more closer critical zone 502. The security system 200 may be configured to activate a variety of anti-theft deterrents 204 whether a person is detected in the caution zone 500, in an activation step 604, or whether the person is detected in the critical zone 502, in an activation step 606. When the security system 200 detects a person in the caution zone 500, in activation step 604, then the security system 200 may activate a theft mode lighting 608 or a perimeter lighting 610. When the security system 200 detects a person in the critical zone 502, in an activation step 606, then the security system 200 may activate an alert beacon light 612, an audible alarm 614, a video feed log 616, or alert data 618. When activating alert data 618, the alert data 618 may be communicated to the off-board controller 208 and the mobile remote 212, to alert the owner/operator of the work machine 100. The alert data 618 may immediately be transmitted to the mobile remote 212 when the security system 200 detects a person in the caution zone 500 or the critical zone 502, via the off-board controller 208 and the off-board network 210. IMU sensors may also be utilized for detecting movement of the work machine 100 to activate the anti-theft deterrents 204.

Figure 7:
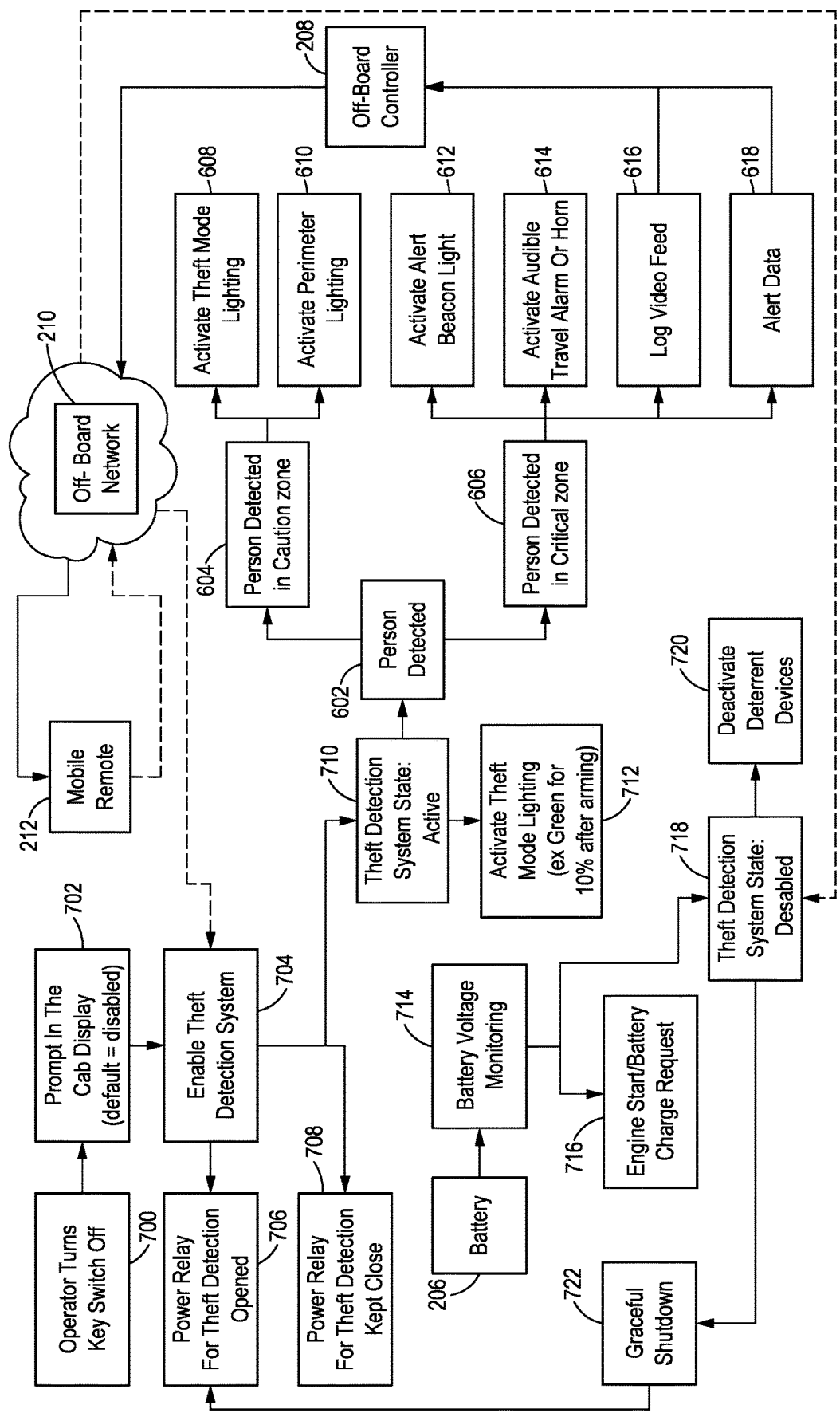
FIG. 7 is a flow diagram of an exemplary security system for a work machine, according to one embodiment of the disclosure.

Referring now to FIG. 7, a flow diagram of the security system 200 in the work machine 100 is illustrated, in one embodiment of the disclosure. When the work machine 100 has completed operations, the work machine 100 may be powered off in a system block 700. A prompt may appear on the display interface 112 to activate or enable the security system 200. The operator may enable the security system 200 by using the display interface 112 in the cab 108 or activate the security system 200 via the mobile remote 212, in a system block 702. As shown in FIG. 7, the security system 200 may be communicable with the off-board network 210, and enabled or disabled with the mobile remote 212, as generally known in the arts. In a system block 704, the on-board controller 202 determines if the security system 200 is enabled or disabled.

When the security system 200 is not enabled the power relay for the security system 200 remains opened, in a system block 706. If the prompt on the display interface 112 is not selected, the display interface 112 may timeout and the power relay will remain open. When the security system 200 is enabled, the power relay for the security system 200 is kept closed, in a system block 708.

In a system block 710, the security system 200 is active and monitoring coverage around the work machine 100 in the detection zone 118. When the security system 200 is activated it may communicate to the on-board controller 202 to initially activate the theft mode lighting 608 for a short period of time, in a system block 712. For example, the theft mode lighting 608 may be a solid green light for 10 seconds after arming and activating the security system 200. This allows an operator to know the security system 200 has been activated when exiting the work machine 100 after activating the security system 200 from the cab 108. It also allows the operator to exit the detection zone 118 within the allotted time without triggering the security system 200 to activate the anti-theft deterrents 204.

In system block 710, the security system 200 will remain monitoring 360-degree coverage around the work machine 100 by using the plurality of imaging devices 114 and the plurality of sensors 116 for detecting unauthorized persons approaching the work machine 100 in the detection zone 118. When the security system 200 detects a person, in activation step 602, the security system 200 may detect the person in the caution zone 500 or the critical zone 502 within the detection zone 118. The security system 200 may be configured to activate a variety of anti-theft deterrents 204 whether a person is detected in the caution zone 500, in activation step 604, or whether the person is detected in the critical zone 502, in activation step 606. When the security system 200 detects a person in the caution zone 500, in activation step 604, then the security system 200 may activate a theft mode lighting 608 or a perimeter lighting 610. The theft mode lighting 608 may be a steady green light, or the like, for deterring theft. Perimeter lighting 610 may be configurable to a timer to automatically turn on/off.

When the security system 200 detects a person in the critical zone 502, in activation step 606, the security system 200 may activate an alert beacon light 612, an audible alarm 614, a video feed log 616, or send alert data 618. The alert beacon light 612 may be a yellow rotating light typically found on mobile equipment, such as police vehicles and ambulances, as generally known in the arts. When activating alert data 618, the alert data 618 may be communicated to the off-board controller 208 and the mobile remote 212 to alert the owner/operator of the work machine 100. The alert data 618 may immediately be transmitted to the mobile remote 212 when the security system 200 detects a person in the caution zone 500 or the critical zone 502. Alert data 618 may include machine serial numbers, time, date, gps, duration, number of detections, corresponding video links for recorded and real-time video feed log 616, and the like.

The battery 206, which powers the security system 200 and work machine 100 when the work machine 100 is turned off, may be connected to the battery monitor 300 so that the voltage of the battery 206 is continuously monitored, in a system block 714. When the battery monitor 300 detects the voltage of the battery 206 reaches a configurable warning threshold, the battery monitor 300 will request the engine 106 to activate via the engine auto-start 302. The battery monitor 300 may communicate with the on-board controller 202 to request the engine 106 to start. The mobile remote 212 may also be used to communicate to the on-board controller 202, via the off-board controller 208 and off-board network 210, to start the engine 106 by using the engine auto-start 302 feature. In a system block 716, the engine auto-start 302, requested by the battery monitor 300, starts the engine 106 and charges the battery 206.

The owner/operator may also disable the security system 200, in a system block 718. The owner/operator may disable the security system 200 by using the display interface 112 in the cab 108. The security system 200 may also recognize an authorized person approaching the work machine 100, whereby the anti-theft deterrents 204 are not activated to allow the authorized person to enter the cab 108 and disable the security system 200. For example, the security system 200 may recognize a unique ID included in a smart key, whereby the on-board controller 202 may compare the unique ID with a stored unique ID to generate an authentication signal to avoid activating the anti-theft deterrents 204. The security system 200 may also be deactivated by authorized users via a message to the on-board controller 202 from a mobile app or via a back office connected via wireless network. The message to the work machine 100 may be an instant command to deactivate or it may deactivate at a specified time. The mobile app may act like a smart key whereby when the user approaches the work machine 100 close enough for a mobile phone to communicate the user ID with the work machine 100 for deactivation. Deactivation schedules may be implemented into the on-board controller 202 or off-board controller 210 for deactivating the security system 200 when they have their operators dispatched for their daily assignments. The owner/operator may also utilize the mobile remote 212 to disable the security system 200. In some situations, an owner/operator may attempt to access the work machine 100 while the security system 200 is enabled causing the anti-theft deterrents 204 to trigger and become activated when entering the detection zone 118. The owner/operator, or other personnel, may deactivate the anti-theft deterrents 204 by accessing the cab 108 of the work machine 100 and entering a pin, code, or other operator login on the display interface 112 to deactivate the anti-theft deterrents 204 and disable the security system 200.

When the security system 200 is disabled, in system block 718, the work machine 100 may deactivate the anti-theft deterrents 204, in a system block 720. Additionally, the work machine 100 may begin a graceful shutdown 722. The graceful shutdown 722 may begin when the security system 200 is disabled or when the battery monitor 300 detects a configurable critical threshold of the remaining voltage in the battery 206. The graceful shutdown 722 allows the security system 200 and on-board controller 202 to complete processing the transmission of info or data collected during coverage monitoring by the plurality of imaging devices 114 and the plurality of sensors 116. The graceful shutdown 722 helps avoids corruption of data transmission to the off-board network 210 when, for example, the power source to the security system 200 immediately ceases. The graceful shutdown 722 will begin prior to the termination of power from the battery 206 and/or engine 106 so that the on-board controller 202 may have sufficient time to transmit data collected by the security system 200 to the off-board network 210, to be stored in cloud computing networks, or the like, as generally known in the arts. When the security system 200 is disabled, the power relay for the security system 200 remains opened, as shown in system block 706

INDUSTRIAL APPLICABILITY

In operation, the present disclosure may find applicability in many industries including, but not limited to, the construction, earth-moving, mining, and agricultural industries. Specifically, the technology of the present disclosure may be used for deterring theft in work machines including, but not limited to, excavators, backhoes, skid steers, wheel loaders, tractors, and the like, comprising valuable and critical components, systems, work tools, and the like. While the foregoing detailed description is made with specific reference to excavators, it is to be understood that its teachings may also be applied onto the other work machines such as backhoes, skid steers, wheel loaders, tractors, mulchers, and the like.

Figure 8:
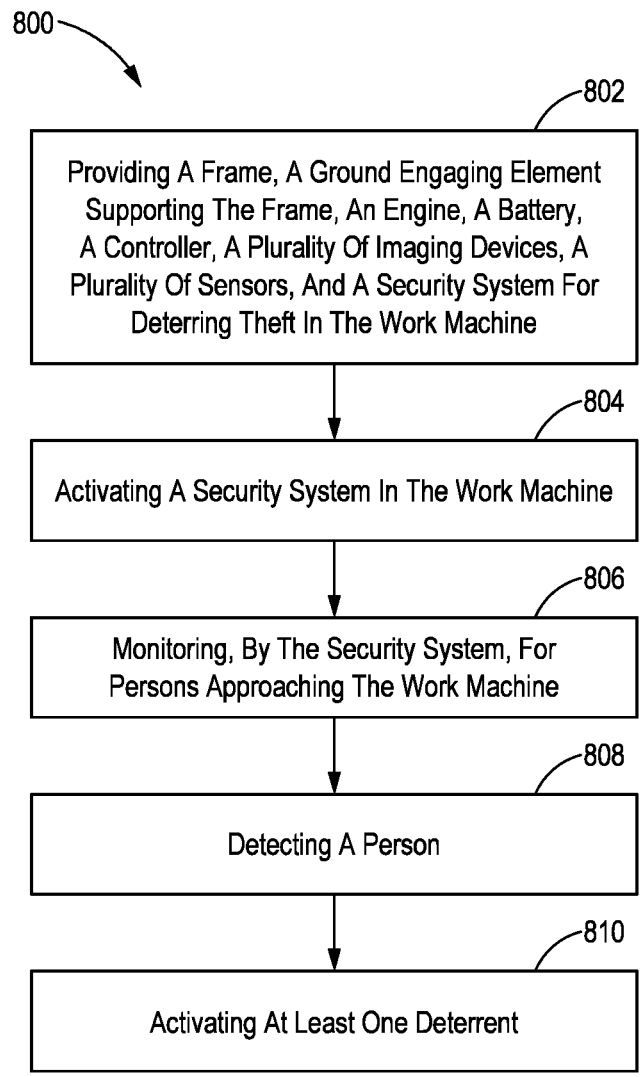
FIG. 8 is a flow chart of a method of using a security system in a work machine to deter theft, according to one embodiment of the disclosure.

Now referring to FIG. 8, a method for deterring theft 800 for protecting the work machine 100 is shown, according to one embodiment of the disclosure. In a step 802, the work machine 100 is provided with the frame 102, the ground engaging elements 104 supporting the frame 102, the engine 106, the battery 206, the on-board controller 202, the plurality of imaging devices 114, the plurality of sensors 116, and the security system 200 for deterring theft of the work machine 100 and its components.

In a step 804, the security system 200 in the work machine 100 is activated. In a step 806, the security system 200 monitors for persons approaching the machine. In a step 808, the security system 200 detects a person in the detection zone 118. In a step 808, at least one deterrent is activated. The anti-theft deterrent may be an audible deterrent, a lighting deterrent, and an imaging deterrent. The audible deterrents may be activating a horn, alarm, engine 106, and/or the like, to deter a potential thief. The lighting deterrent may be an activation of the theft mode lighting 608, the perimeter lighting 608, the alert beacon light 612, and/or the like. The imaging deterrent may be camera flashing, video recording, and/or logging real-time video feed.

The method 800 may further consist of capturing an image of a person approaching the machine and storing the image, alerting a central location by communicating with the off-board controller 208.

When the life of the battery 206 falls below a warning threshold, such as when the voltage or life of the battery 206 is low, the engine auto-start 302 may activate the engine 106 in the work machine 100. The method 800 may further consist of activating a control module to restrict access to the operational systems 214 in the work machine 100.

From the foregoing, it can be seen that the technology disclosed herein has industrial applicability in a variety of settings such as, but not limited to, activating a deterrent for deterring a potential theft of the work machine 100 and its components.

What is claimed is:

1. A work machine comprising:
a frame;
a battery;
a ground engaging element supporting the frame; and
a security system configured to activate an at least one anti-theft deterrent when an unauthorized person is detected in a detection zone around the work machine, the the security system further includes:
a plurality of imaging devices and a plurality of sensors providing 360-degree coverage monitoring:
an engine mounted on the frame;
the battery operatively mounted with the engine;
an engine auto-start system; and
a battery monitor configured to detect a warning threshold in the battery;
the engine auto-start system activating the engine when the battery monitor detects a warning threshold of the battery, the engine being configured to recharge the battery:
the security system being further configured to continuously detect for unauthorized persons in the detection zone while the work machine is off.

2. The work machine of claim 1, further comprising:
a controller, the controller connected to an at least one anti-theft deterrent in the work machine, the controller being configured to activate the at least one anti-theft deterrent when the plurality of cameras or the plurality of sensors detect an unauthorized person within a detection zone; and a controller, the controller connected to the at least one anti-theft deterrent in the work machine, the controller being configured to activate the at least one anti-theft deterrent when the plurality of cameras or the plurality of sensors detect an unauthorized person within the detection zone.

3. The work machine of claim 1, the security system connected to an off-board network and mobile remote, the mobile remote configured to activate and deactivate the security system and the at least one anti-theft deterrent.

4. The work machine of claim 1, the work machine further comprises a battery monitor and a display interface.

5. The work machine of claim 1, the at least one anti-theft deterrent is one chosen from the group consisting of a theft mode lighting deterrents, a perimeter lighting deterrent, an alert beacon lighting deterrent, an audible deterrent, a video logging deterrent, an off-board network alert, a horn deterrent, and an imaging deterrent.

6. The work machine of claim 1, the detection zone further including a caution zone and a critical zone.

7. The work machine of claim 6, the security system provides coverage up to 16 meters around the work machine.

8. A security system for a work machine comprising:
a battery;
a plurality of cameras providing 360-degree coverage monitoring around the work machine;
a plurality of sensors providing 360-degree coverage monitoring around the work machine; and
a controller, the controller connected to an at least one anti-theft deterrent in the work machine, the controller being configured to activate the at least one anti-theft deterrent when the plurality of cameras or the plurality of sensors detect an unauthorized person within a detection zone, the security system further includes:
an engine;
the battery operatively mounted with the engine;
a battery monitor configured to detect a power warning threshold in the battery;
the engine auto-start system activates, via the controller, the engine when the battery monitor detects the power warning threshold, the engine configured to recharge the battery;
the security system further configured to continuously detect for unauthorized persons in the detection zone while the work machine is off.

9. The security system of claim 8, the at least one anti-theft deterrent is one chosen from the group consisting of a theft mode lighting deterrents, a perimeter lighting deterrent, an alert beacon lighting deterrent, an audible deterrents, a video logging deterrents, an off-board network alert, a horn deterrent, and an imaging deterrent.

10. The security system of claim 8, the security system further comprises a display interface.

11. The security system of claim 8, the controller is further connected an off-board controller, an off-board network, and a mobile remote, the mobile remote configured to activate and deactivate the security system and the at least one anti-theft deterrent.

12. A method for deterring theft in a work machine, comprising:
providing a frame, a ground engaging element supporting the frame, an engine, a battery operatively mounted to the engine, a controller, a plurality of imaging devices, a plurality of sensors, an engine, an engine auto-start system, a battery monitor, and a security system for deterring theft in the work machine;
activating the security system in the work machine;

monitoring, by the security system via the plurality of imaging devices and the plurality of sensors, for persons approaching the work machine;

recharging the battery when the battery monitor detects a power warning threshold in the battery by activating the engine via the engine auto-start system, the engine configured to recharge the battery and continue anti-theft monitoring by the security system for extended periods of time while the work machine is off;

detecting an unauthorized person; and activating at least one anti-theft deterrent.

13. The method of claim 12, the at least one anti-theft deterrent is one chosen from the group consisting of a theft mode lighting deterrents, a perimeter lighting deterrent, an alert beacon lighting deterrent, an audible deterrents, a video logging deterrents, an off-board network alert, a horn deterrent, and an imaging deterrent.

14. The method of claim 13, further comprising activating or restricting access to an operational system in the work machine.

15. The method of claim 14, further comprising:

providing an off-board controller, an off-board network connected to the controller; and controlling the security system with a mobile remote connected to the off-board network and the off-board controller.

16. The method of claim 15, further comprising alerting a central location;

capturing an image of a person approaching the work machine; and storing the image in the off-board network.

* * * * *